US012584005B2

(12) United States Patent (10) Patent No.: US 12,584,005 B2
Takahashi (45) Date of Patent: Mar. 24, 2026

(54) RESIN COMPOSITION FOR SLIDING MEMBER, AND SLIDING MEMBER

(71) Applicant: OILES CORPORATION, Tokyo (JP)

(72) Inventor: Kohei Takahashi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 684 days.

(21) Appl. No.: 17/920,350

(22) PCT Filed: Apr. 5, 2021

(86) PCT No.: PCT/JP2021/014541
§ 371 (c)(1),
(2) Date: Oct. 20, 2022

(87) PCT Pub. No.: WO2021/215233
PCT Pub. Date: Oct. 28, 2021

(65) Prior Publication Data
US 2023/0183459 A1 Jun. 15, 2023

(30) Foreign Application Priority Data
Apr. 21, 2020 (JP) ................................. 2020-075752

(51) Int. Cl.
*C08L 23/06* (2006.01)
*F16C 33/20* (2006.01)

(52) U.S. Cl.
CPC .............. *C08L 23/06* (2013.01); *F16C 33/20* (2013.01); *C08L 2203/30* (2013.01); *C08L 2205/025* (2013.01); *C08L 2205/035* (2013.01); *C08L 2207/062* (2013.01); *F16C 2208/76* (2013.01)

(58) Field of Classification Search
None
See application file for complete search history.

(56) References Cited

U.S. PATENT DOCUMENTS

| | | | |
|---|---|---|---|
| 4,791,020 A * | 12/1988 | Kokta | C08J 5/10 |
| | | | 428/326 |
| 2006/0067747 A1 | 3/2006 | Matsuda et al. | |
| 2008/0249212 A1* | 10/2008 | Sigworth | C08L 23/02 |
| | | | 524/53 |
| 2010/0048433 A1 | 2/2010 | Yamamoto | |
| 2011/0082059 A1 | 4/2011 | Iwata | |
| 2014/0235767 A1 | 8/2014 | Hatanaka et al. | |
| 2015/0314574 A1 | 11/2015 | Mogawa | |
| 2018/0030270 A1 | 2/2018 | Yalcin | |
| 2020/0224009 A1 | 7/2020 | Kim et al. | |
| 2021/0108055 A1 | 4/2021 | Iida et al. | |

FOREIGN PATENT DOCUMENTS

| | | |
|---|---|---|
| CN | 101522874 A | 9/2009 |
| CN | 105026281 A | 11/2015 |
| CN | 105566783 A | 5/2016 |

| | | | |
|---|---|---|---|
| CN | 112430358 | * | 8/2019 |
| JP | 49-78749 | | 7/1974 |
| JP | 60-79009 | | 5/1985 |
| JP | 61-238808 | | 10/1986 |
| JP | 63-207851 | | 8/1988 |
| JP | 2-219849 | | 9/1990 |
| JP | 5-263560 | | 10/1993 |
| JP | 6-345961 | | 12/1994 |
| JP | 9-177765 A | | 7/1997 |
| JP | 10-139942 A | | 5/1998 |
| JP | 10-212400 | | 8/1998 |
| JP | 2002-292799 | | 10/2002 |
| JP | 2002-292799 A | | 10/2002 |
| JP | 2002-363403 | | 12/2002 |
| JP | 2003-226808 | | 8/2003 |
| JP | 2003-335939 | | 11/2003 |
| JP | 2006-119608 A | | 5/2006 |
| JP | 2011-79921 | | 4/2011 |
| JP | 2012-251006 A | | 12/2012 |
| JP | 2013-116938 A | | 6/2013 |
| JP | 2013-133164 A | | 7/2013 |
| JP | 2013-249343 A | | 12/2013 |
| JP | 2014-30942 | | 2/2014 |
| JP | 2014-043018 A | | 3/2014 |
| JP | WO2013/047618 A | | 3/2015 |
| JP | 2015-129244 | | 7/2015 |
| JP | 2015-134631 A | | 7/2015 |
| JP | 2015-134632 A | | 7/2015 |
| JP | 2015-231870 | | 12/2015 |
| JP | 2016-132759 A | | 7/2016 |
| JP | 2016-139798 A | | 8/2016 |
| JP | 2017-179305 A | | 10/2017 |
| JP | 2018-135133 | | 8/2018 |
| JP | 2019-34519 | | 3/2019 |
| JP | 2019-065140 A | | 4/2019 |
| JP | 2019-94509 | | 6/2019 |

(Continued)

OTHER PUBLICATIONS

Office Action dated Mar. 8, 2024 issued in Chinese Application No. 202180029405.6 with English translation (16 pages).

(Continued)

*Primary Examiner* — Katarzyna I Kolb

(74) *Attorney, Agent, or Firm* — NIXON & VANDERHYE, PC

(57) ABSTRACT

The present invention provides a resin composition for sliding member and a sliding member having excellent moldability and sliding properties that contains plant-derived polyethylene resin as a main component. In the resin composition for sliding member, as additives, petroleum-derived polyethylene resin of 0.1 to 20% by mass, modified polyolefin resin of 0.1 to 10% by mass, lubricating oil of 0.5 to 5% by mass, and plant-derived filler of 0.1 to 50% by mass are blended in addition to plant-derived polyethylene resin as a main component. A sliding member is produced by molding this resin composition for sliding member.

10 Claims, 1 Drawing Sheet

(56) References Cited

FOREIGN PATENT DOCUMENTS

| | | | |
|---|---|---|---|
| JP | 2019-094509 | A | 6/2019 |
| JP | 2019-151802 | | 9/2019 |
| JP | 2019190661 | A * | 10/2019 |
| JP | 2019-199305 | | 11/2019 |
| JP | 2019-199305 | A | 11/2019 |
| JP | 2020-026485 | A | 2/2020 |
| JP | 2020-34164 | | 3/2020 |
| JP | WO2019/066071 | | 9/2020 |
| WO | 2019/098210 | A1 | 5/2019 |
| WO | 2019/208692 | A1 | 10/2019 |

OTHER PUBLICATIONS

Office Action dated Oct. 29, 2024 issued in Japanese Application No. 2024-026719 with English translation (11 pages).
International Search Report for PCT/JP2021/014541 dated May 18, 2021, 5 pages.
Written Opinion of the ISA for PCT/JP2021/014541 dated May 18, 2021, 4 pages.
International Search Report for PCT/JP2021/014963 dated Jun. 1, 2021, 7 pages.
Written Opinion of the ISA for PCT/JP2021/014963 dated Jun. 1, 2021, 6 pages.
Decision of Refusal dated Dec. 5, 2023 issued in Japanese Application No. 2020-075752 with English machine translation (7 pages).
Office Action dated Sep. 26, 2023 issued in Chinese Application No. 202180029402.2 with English translation (17 pages).
Office Action dated Nov. 13, 2024 issued in Chinese Application No. 202180029405.6 with English translation (14 pages).
Office Action dated Jul. 25, 2023 issued in Japanese Application No. 2020-075752 with English translation (8 pages).
Extended European Search Report dated Apr. 8, 2024 issued in European Application No. 21793710.1 (11 pages).
Office Action dated Apr. 22, 2024 issued in Chinese Application No. 202180029402.2 with English translation (14 pages).
Extended European Search Report dated Apr. 16, 2024 issued in European Application No. 21792404.2 (6 pages).
Office Action dated Jul. 1, 2025 issued in Indian Application No. 202247065085 (7 pages).
Office Action dated Feb. 4, 2025 issued in Japanese Application No. 2022-516956 with English translation (19 pages).
Office Action dated Aug. 19, 2025 issued in Japanese Application No. 2022-516956 with English language translation (6 pages).
Examination Report dated Sep. 15, 2025 issued in Indian Application No. 202247065087 (7 pages).

* cited by examiner

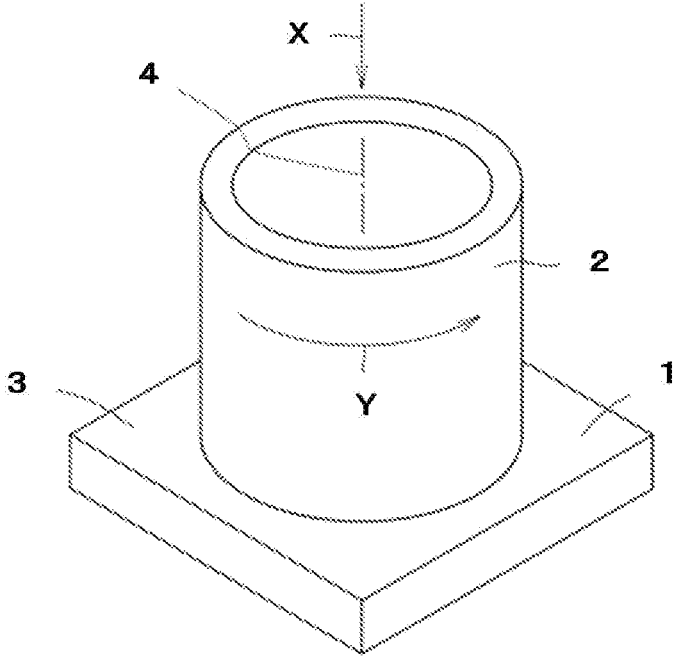

RESIN COMPOSITION FOR SLIDING MEMBER, AND SLIDING MEMBER

CROSS-REFERENCE TO RELATED APPLICATIONS

This application is the U.S. national phase of International Application No. PCT/JP2021/014541 filed Apr. 5, 2021 which designated the U.S. and claims priority to JP Patent Application No. 2020-075752 filed Apr. 21, 2020, the entire contents of each of which are hereby incorporated by reference.

TECHNICAL FIELD

The present invention relates to a resin composition for sliding member containing plant derived polyethylene resin as a main component, and a sliding member such as a bearing with excellent friction and wear characteristics.

BACKGROUND ART

In recent years, due to heightened awareness of preventing global warming and reducing oil usage as a depleted resource, lactic acid polymer, plant derived polyethylene resin, etc. been attracting attention. Lactic acid polymer is produced by lactic acid fermentation of sugar obtained by decomposing carbohydrate (starch, etc.) contained in grain, bean, potato, etc. or sugar contained in sugar cane, as a raw material. Plant derived polyethylene resin is produced based on ethylene extracted from bioethanol that is produced from corn etc. as a raw material.

For example, as a resin composition using lactic acid polymer, lubricating resin composition with biodegradability (Patent Literature 1) has been proposed. The lubricating resin composition contains aliphatic polyester with lactic acid content of 50 to 100% by volume as a main component and contains 5 to 30% by volume of one or more solid lubricants selected from a group consisting of polytetrafluoroethylene resin, graphite and mica. However, polylactic acid resin that is a main component of the lubricating resin composition, is not suitable for sliding applications because it has low mechanical strength and may cause hydrolysis.

Further, a sliding member (Patent Literature 2) containing polyamide containing one type of dicarboxylic acid and one type of diamine, and inorganic filler has been proposed. And further, a sliding member with a high degree of biomass that uses plant-derived decamethylenediamine as diamine have been proposed. However, this sliding member may cause stick slip (adhesion-slip) between friction surfaces during sliding.

On the other hand, as a technique using plant-derived polyethylene resin, a packaging container or a packaging laminate using plant-derived polyethylene resin has been proposed in Patent Literatures 3-6, etc. Some of these have been put to practical use. However, the fact is that it has not yet been proposed for sliding applications such as mechanical elements such as sliding bearings.

CITATION LIST

Patent Literature

Patent Literature 1: Japanese Unexamined Patent Application Laid-Open No. H10-212400
Patent Literature 2: Japanese Unexamined Patent Application Laid-Open No. 2015-129244

Patent Literature 3: Japanese Unexamined Patent Application Laid-Open No. 2014-30942
Patent Literature 4: Japanese Unexamined Patent Application Laid-Open No. 2015-231870
Patent Literature 5: Japanese Unexamined Patent Application Laid-Open No. 2018-135133
Patent Literature 6: Japanese Unexamined Patent Application Laid-Open No. 2019-34519

SUMMARY OF INVENTION

Technical Problem

In view of the above circumstances, the inventor has diligently studied application of plant-derived polyethylene resin to sliding application. As a result, the inventor found that it can be applied to sliding application such as a slide bearing, etc. by blending a predetermined amount of additives with plant-derived polyethylene resin. Therefore, an object of the present invention is to provide a resin composition for sliding member and a sliding member having excellent moldability and slidability that contains plant-derived polyethylene resin as a main component.

Solution to Problem

A resin composition for sliding member of the present invention (hereinafter abbreviated as the resin composition) contains, as additives, petroleum-derived polyethylene resin of 0.1 to 20% by mass, modified polyolefin resin of 0.1 to 10% by mass, lubricating oil of 0.5 to 5% by mass, and plant-derived filler of 0.1 to 50% by mass, in addition to plant-derived polyethylene resin that is a main component.

According to the resin composition of the present invention, molding material made of this resin composition has good biting property into a screw of a molding machine and excellent molding processability, and a surface of a molded product has an excellent surface condition. According to the sliding member made of this resin composition, mechanical strength of the plant-derived polyethylene resin as the main component is improved. And regarding sliding friction with opposite member, it is possible to improve sliding characteristics including low friction and wear resistance.

The resin composition of the present invention may contain lubricant in a proportion of 0.1 to 5% by mass and colorant in a proportion of 1 to 5% by mass, as additional components.

The lubricant as the additional component serves as a mold release agent that improves mold release property of the resin composition in molding, and also serves as a carrier that absorbs and retains the lubricating oil. By this, bleed out of the lubricating oil can be suppressed. Therefore, not only that the blending amount of the lubricating oil can be increased, but also slidability of the sliding member can be further improved by merging the lubricating oil and the lubricant.

Advantageous Effects of Invention

According to the present invention, it is provided that the resin composition and the sliding member that have good molding processability such as biting into the screw of the molding machine, and can make mechanical strength of plant-derived polyethylene resin as the main component improved, and further can make sliding properties including low friction and wear resistance improved.

BRIEF DESCRIPTION OF DRAWINGS

FIG. 1 is a perspective explanation view for explaining a thrust test method.

DESCRIPTION OF EMBODIMENTS

The resin composition of the present invention contains, as additives, petroleum-derived polyethylene resin of 0.1 to 20% by mass, modified polyolefin resin of 0.1 to 10% by mass, lubricating oil of 0.5 to 5% by mass, and plant-derived filler of 0.1 to 50% by mass, in addition to plant-derived polyethylene resin that is a main component.

In the resin composition of the present invention, the plant-derived polyethylene resin is homopolymer of plant-derived ethylene derived from bioethanol obtained from plants such as sugar cane or corn, or copolymer of this plant-derived ethylene and another monomer. Here, polymerization reaction from ethylene to polyethylene (PE) is the same as the case of polymerizing petroleum-derived ethylene.

Specifically, high-density polyethylene, medium-density polyethylene, high-pressure low-density polyethylene, linear low-density polyethylene, and mixtures thereof that are obtained by polymerizing the plant-derived ethylene derived from the above bioethanol can be exemplified. The other monomer (comonomer) to be copolymerized with the plant-derived ethylene is α-olefin having 3 to 20 carbon atoms, preferably 4 to 8 carbon atoms. Specifically, propylene, 1-butene, 1-pentene, 1-hexene, 1-octene, 1-heptene, 4-methyl-pentene-1,4-methyl-hexene-1,4,4-dimethylpentene-1, etc. are exampled.

In the present invention, the plant-derived polyethylene resin preferably has a density between 0.910 and 0.960 g/cm³. Further, it is preferable that the plant-derived polyethylene has a plant degree (%) (ASTM6866, measurement of content of radioactive carbon 14C) of 80% or more. When plant degree is 80% or more, $CO_2$ can be reduced by about 70 to 74% as compared with petroleum-derived polyethylene. By this, it is possible to use depleting resources effectively and to reduce the amount of $CO_2$ generated that causes greenhouse gases significantly.

The melt flow rate (JISK7210, temperature: 190° C., load: 2.16 kg) of the plant-derived polyethylene resin is preferably 0.5 to 10 g/10 minutes from the viewpoint of extrusion processability, and particularly preferably 1.0 to 5.0 g/10 minutes. When the melt flow rate is 0.5 to 10 g/10 minutes, extrusion processability can be maintained well.

Specific examples of the plant-derived polyethylene resin include plant-derived high-density polyethylene resin (HDPE) "GREEN-SHE150, -SGF4960" (both product names) and linear low-density polyethylene resin (LLDPE) "GREEN-SLH118" that are manufactured by Braskem S. A. For sliding applications, the plant-derived high-density polyethylene resin is suitable.

The petroleum-derived polyethylene resin blended in the resin composition of the present invention is finely dispersed in the plant-derived polyethylene resin that is the main component. By this, slidability such as friction and wear of a molded product (hereinafter referred to as a sliding member) made of the resin composition is improved. As the petroleum-derived polyethylene resin, high-density polyethylene resin, ultra-high molecular weight polyethylene resin, acid-modified ultra-high molecular weight polyethylene resin, etc. are used. As the acid-modified ultra-high molecular weight polyethylene resin, maleic anhydride acid-modified ultra-high molecular weight polyethylene resin is preferable.

The high density polyethylene resin (HDPE) is a homopolymer of ethylene produced by the medium/low pressure method, and its density is usually 0.940 to 0.970 g/cm³. Examples of the high-density polyethylene resin (HDPE) include "HI-ZEX (product name)" manufactured by Prime Polymer Co., Ltd. and "Novatec (product name)" manufactured by Japan Polyethylene Corporation. Resin whose ultimate viscosity [η] measured in a decalic acid solvent at 135° C. is 10 dl/g or more and average viscosity molecular weight is 500,000 to 6,000,000 can be used as the ultra-high molecular weight polyethylene resin (UHPE). Examples of the ultra-high molecular weight polyethylene resin (UHPE) include "HI-ZEX Million (product name)" manufactured by Mitsui Chemicals, Inc., "MIPELON (product name)" manufactured by Mitsui Chemicals, Inc., and "SUNFINE (product name)" manufactured by Asahi Kasei Chemicals Co., Ltd., etc. Further, resin that consists of ultra high molecular weight polyethylene resin having the ultimate viscosity [η] of 10 to 40 dl/g at 135° C. and low molecular weight or high molecular weight polyethylene resin having the ultimate viscosity [η] of 0.1 to 5 dl/g at 135° C. can be used as the ultra-high molecular weight polyethylene resin. Examples of the ultra-high molecular weight polyethylene resin include "LUBMER (product name)" manufactured by Mitsui Chemicals, Inc. Examples of the acid-modified ultra-high molecular weight polyethylene resin include "MODIFIED LUBMER (product name)" manufactured by Mitsui Chemicals, Inc. that is modified with maleic anhydride.

One or more of the above petroleum-derived polyethylene resins are selected, and the blending amount is 0.1 to 20% by mass, preferably 0.5 to 15% by mass. If the blending amount is less than 0.1% by mass, there is no effect in improving the sliding characteristics of the sliding member made of the resin composition. On the other hand, if the blending amount exceeds 20% by mass, the melt viscosity of the resin composition in molding increases so that fluidity tends to deteriorate and appearance of a molded product may deteriorate.

The modified polyolefin resin blended in the resin composition of the present invention is modified polyolefin resin capable of performing an interaction with the plant-derived polyethylene resin that is the main component. The modified polyolefin resin serves as a compatibilizer that finely disperses the petroleum-derived polyethylene resin in the matrix of the plant-derived polyethylene resin that is the main component and disperses plant-derived filler described later in the matrix of the plant-derived polyethylene resin. By this, the modified polyolefin resin significantly improves sliding properties including low friction and wear resistance without reducing the mechanical strength of the sliding member made of the resin composition.

The modified polyolefin resin is selected from polyolefin resin graft-modified with unsaturated carboxylic acid, anhydride thereof or derivative thereof, and polyolefin resin saponified obtained by saponifying polyolefin resin having an acetoxy group in a molecular chain with alkali. Examples of the polyolefin resin include homopolymer of α-olefin, copolymer of two or more kinds of α-olefins, or copolymer of α-olefin and other compound copolymerizable with the α-olefin. Examples of the α-olefin include α-olefins having 2 to 20 carbon atoms such as ethylene, propylene, 1-butene, 1-hexene, 4-methyl-1-pentene, 1-octene, 1-decene, 1-dodecene, 1-tetradecene, 1-hexadecene, 1-octadecene, and 1-eikosen. Examples of the other compound include a compound having polyunsaturated bond, vinyl acetate, and acrylic acid ester, etc. Examples of the polyunsaturated bond include conjugated diene and non-conjugated diene, etc.

Suitable examples of the polyolefin resin include low density, medium or high density polyethylene, linear low density polyethylene, polypropylene, α-olefin copolymers [ethylene-propylene copolymer, ethylene-vinyl acetate copolymer (EVA), ethylene-butene copolymer, ethylene-hexene copolymer, ethylene-octene copolymer, ion-cross-linked olefin copolymer (ionomer)], etc.

Unsaturated carboxylic acid, anhydride thereof or derivative thereof is a compound having ethylenically unsaturated bonds and a carboxyl group, acid anhydride or a derivative group in one molecule. Specific examples of the unsaturated carboxylic acid include unsaturated carboxylic acid such as acrylic acid, methacrylic acid, α-ethylacrylic acid, maleic acid, fumaric acid, tetrahydrophthalic acid, methyltetrahydrophthalic acid, itaconic acid, citraconic acid, crotonic acid, isocrotonic acid, endosis-bicyclo[2.2.1] hept-5-en-2,3-dicarboxylic acid [nadic acid], methyl-endosis-bicyclo[2.2.1] hept-5-en-2,3-dicarboxylic acid [methylnadic acid]; anhydrides of these unsaturated carboxylic acids; and derivatives such as unsaturated carboxylic acid halides, unsaturated carboxylic acid amides, and unsaturated carboxylic acid imides. More specifically, maleyl chloride, maleimide, N-phenylmaleimide, maleic anhydride, itaconic anhydride, citraconic anhydride, monomethyl maleate, dimethyl maleate, glycidyl maleate, etc. can be mentioned. Among these, the acrylic acid, the methacrylic acid, the maleic acid, the maleic anhydride, and the itaconic anhydride are preferable, and the maleic anhydride is particularly preferable.

Examples of the maleic anhydride-modified polyolefin resin include maleic anhydride-modified polyethylene resin, maleic anhydride-modified polypropylene resin, maleic anhydride-modified ethylene-α-olefin copolymer (ethylene-propylene copolymer, ethylene-vinyl acetate copolymer, ethylene-butene copolymer, ethylene-hexene copolymer, ethylene-octene copolymer, etc.), and maleic anhydride-modified styrene-ethylene/butylene-styrene copolymer (SEBS), etc.

As the polyolefin resin saponified, ethylene-vinyl acetate copolymer saponified is given as a preferable example.

The modified polyolefin resin used in the present invention conforms to JIS K7210 (2014). And its melt flow rate (MFR) measured at a temperature of 190° C. or 230° C. under a load of 2.16 kg is preferable 0.1 to 100 g/10 minutes and is particularly preferable 0.1 to 50 g/10 minutes. If the melt flow rate is less than 0.1 g/10 minutes, the viscosity becomes too high so that the fluidity of the resin composition is poor. By this, the moldability of melt extrusion molding, etc. may deteriorate. On the other hand, if the melt flow rate exceeds 100 g/10 minutes, the moldability becomes unstable. By this mechanical strength of the sliding member may be lowered.

Specific examples of the modified polyolefin resin used in the present invention are shown below. Examples of the maleic anhydride-modified polyethylene resin and the maleic anhydride-modified polypropylene resin include "ADMER (product name)" manufactured by Mitsui Chemicals, Inc. and "Modic (product name)" manufactured by Mitsubishi Chemical Corporation, etc. Examples of the maleic anhydride-modified ethylene-propylene copolymer include "TAFMER (product name)" manufactured by Mitsui Chemicals, Inc. Examples of the maleic anhydride-modified ethylene-butene copolymer include "TAFMER (product name)" manufactured by Mitsui Chemicals, Inc. Examples of the maleic anhydride-modified styrene-ethylene/butylene-styrene copolymer include "Tuftec (product name)" manufactured by Asahi Kasei Corp., "SEPTON (product name)" manufactured by Kuraray Co., Ltd., and "KRATON (product name)" manufactured by Kraton Polymer Japan Corp. Examples of the ethylene-vinyl acetate copolymer saponified include "Technolink (product name)" manufactured by Taoka Chemical Co., Ltd., "MELTHENE" (product name) manufactured by Tosoh Corporation, "EVAL" (product name) manufactured by Kuraray Co., Ltd., and "Soarnol" (product name) manufactured by Mitsubishi Chemical Corporation.

The blending amount of the modified polyolefin resin is 0.1 to 10% by mass, preferably 1 to 5% by mass. If the blending amount is less than 0.1% by mass, the mechanical strength of the sliding member made of the resin composition, particularly load bearing capacity and sliding characteristics due to improvement of compressive strength is not improved. On the other hand, if the blending amount exceeds 10% by mass, the moldability of the resin composition may be deteriorated.

The plant-derived filler blended in the resin composition of the present invention is dispersed and contained in the sliding member made of the resin composition to improve the mechanical strength, particularly the compressive strength of the sliding member, and to perform as a carrier that absorbs and retains lubricating oil described later. In this plant-derived filler, the surface of the filler is coated with the modified polyolefin resin that acts as the compatibilizer, so that the compatibility with the resin composition is improved and the dispersibility of the plant-derived filler is improved.

Examples of the plant-derived filler include cellulose nanofiber manufactured by performing mechanical defibration processing with natural plant-derived cellulose fiber (pulp fiber) such as wood fiber (needle leaved tree pulp such as Japanese red pine, Japanese black pine, *Abies sachalinensis*, yeddo spruce, *Pinus koraiensis*, larch, fir, southern Japanese hemlock, Japanese, white cedar, larch, silver fir, hondo spruce, cypress, douglas fir, hemlock, white fir, spruce, *Abies balsamea*, cedar, pine, merkus pine, *Pinus radiata*, etc., mixtures thereof, and broadleaf tree pulp such as beech, birch, *Alnus japonica*, oak, *Machilus thunbergii*, castanopsis, white birch, Japanese aspen, poplar, Japanese ash, *Populus suaveolens, eucalyptus*, mangrove, lauan, acacia, etc., mixtures thereof), bamboo fiber, sugar cane fiber, seed hair fiber (cotton fiber (cotton linter), Kapok, etc.), stem fiber (hemp, kozo, oriental paper bush, etc.), leaf fiber (manila hemp, sisal hemp, new zealand flax, *Apocynum venetum* (luobuma fiber), etc.), fruit fiber (palm), soft rush, wheat straw, etc., cellulose granules (powder), and cellulose fiber.

Average fiber length (L) of the cellulose fiber and the cellulose nanofiber as the plant-derived filler is preferably 0.1 to 100 μm, particularly preferable 0.5 to 80 μm. Average fiber diameter (diameter: D) of them is preferably 4 nm to 100 μm, more preferably 4 nm to 90 μm. And, aspect ratio (L/D) is preferably 2 to 2,000, more preferably 20 to 1,000. Further, average particle size of the cellulose granules is 50 μm or less, preferably 40 μm or less. The fiber or granules having these properties can improve dispersibility and affinity for the plant-derived polyethylene resin.

Therefore, it is possible to improve mechanical strength, particularly compressive strength, of the sliding member made of the resin composition.

Specific examples of the cellulose fiber and the cellulose nanofiber as the plant-derived filler used in the present invention include "Fibra Cel (product name)" manufactured by Celite Corporation, "Nanoforest (product name)" manufactured by Chuetsu Pulp & Paper Co., Ltd., "BiNFi-s (Binfis: product name)" manufactured by Sugino Machine Limited, "cellenpia (product name)" manufactured by Nippon Paper Industries Co., Ltd., "Serish (product name)" manufactured by Daicel finechem Ltd, and "fluorene cellulose (product name)" manufactured by Osaka Gas Chemicals Co., Ltd. Examples of specific examples of the cellulose granules include "KC flock (product name)" manufactured by Nippon Paper Industries Co., Ltd., "CEOLUS (product name)" manufactured by Asahi Kasei Corp., "Tosco hemp cellulose powder, Tosco Silk Powder, Bamboo Powder (all product names)" manufactured by TOSCO Co., Ltd., and "Cellulose Powder (product name)" manufactured by TDI corp.

The blending amount of the plant-derived filler is 0.1 to 50% by mass, preferably 2 to 30% by mass. If the blending amount is less than 0.1% by mass, the strength of the sliding member made of the resin composition is not improved. On the other hand, if the blending amount exceeds 50% by mass, the moldability may be deteriorated.

The lubricating oil blended in the resin composition of the present invention imparts low friction to the sliding member made of the resin composition to improve the slidability.

Examples of the lubricating oil include paraffin based and naphthenic based mineral oil such as spindle oil, refrigerating machine oil, dynamo oil, turbine oil, machine oil, cylinder oil, and gear oil, etc., animal oil such as whale oil, etc., vegetable oil whose main component is unsaturated fatty acid such as oleic acid, linoleic acid, and linolenic acid, such as flaxseed oil, tung oil, castor oil, safflower oil, soybean oil, cottonseed oil, palm oil, rapeseed oil, jojoba oil, linoleic acid and linolenic acid, etc., hydrocarbon-based synthetic oil such as α-olefin oligomer and hydride thereof, the α-olefin oligomer being such as polybutene, polyisobutylene, 1-octene oligomer, 1-decene oligomer and ethylene-propylene copolymer, etc., and ether-based synthetic oil such as polyoxyalkylene glycol oil and polyphenyl ether oil, etc.

The blending amount of the lubricating oil is 0.5 to 5% by mass, preferably 1 to 3% by mass. If the blending amount is less than 0.5% by mass, the slidability is not improved. On the other hand, if the blending amount exceeds 5% by mass, decrease in the mechanical strength of the sliding member, deterioration of surface appearance of the sliding member, and poor bite into the screw may occur.

In the resin composition of the present invention, lubricant and colorant (pigment or dye) may be blended as additional components.

In the case that the lubricant is used in combination with lubricating oil blended in the resin composition, the blending amount of the lubricant can be increased because that the lubricant acts as a carrier for absorbing and retaining the lubricating oil. By this, the slidability of the resin composition can be further improved.

The lubricant is lubricating oil that becomes liquid when molding heating. Examples of the lubricant include waxy substance such as natural wax such as montan wax and carnauba wax, hydrocarbon wax, higher fatty acid, and wax obtained by inducing the higher fatty acid, etc.

Examples of the hydrocarbon wax include paraffin wax, microwax, polyethylene wax, polyethylene oxide wax, etc.

Examples of the higher fatty acid include higher saturated fatty acid having 10 or more carbon atoms, preferably 12 or more carbon atoms, such as lauric acid, myristic acid, palmitic acid, stearic acid, behenic acid, arachidic acid, cerotic acid, montanic acid, and melissic acid, and unsaturated fatty acid having 12 or more carbon atoms, such as oleic acid, linoleic acid, linolenic acid, elaidic acid, octadecenoic acid, arachidonic acid, gadoleic acid, erucic acid and parinalic acid.

Examples of the wax obtained by inducing the above-mentioned higher fatty acid include higher fatty acid ester, higher fatty acid amide, higher fatty acid salt, etc.

The higher fatty acid ester is ester obtained by reacting the higher fatty acid with aliphatic alcohol such as monohydric saturated fatty acid alcohol, monounsaturated fatty acid alcohol, and polyhydric alcohol.

Specific examples of the higher fatty acid ester include ester of higher fatty acid having 12 to 26 carbon atoms such as stearyl stearate and behenyl behenate and monoalcohol having 12 to 24 carbon atoms, ester of alkylene diol having 2 to 6 carbon atoms such as ethylene glycol mono or dipalmitinate, ethylene glycol mono or distearate, ethylene glycol mono or dibehenate, ethylene glycol mono or dimontanate and higher fatty acid having 12 to 26 carbon atoms, mono, di or triester of alcan triol (glycerin, etc.) with 3 to 6 carbon atoms such as glycerin mono, di or tripalmitinate, glycerin mono, di or tristearate, glycerin mono, di or tribehenate, and glycerin mono, di or trimontanate and higher fatty acid with 12 to 24 carbon atom; mono, di, tri or tetraester of pentaerythritol such as pentaerythritol mono, di, tri or tetrapalmitinate, pentaerythritol mono, di, tri or tetrastearate, pentaerythritol mono, di, tri or tetrabehenate, and pentaerythritol mono, di, tri or tetramontanate and higher fatty acid having 14 to 24 carbon atoms.

Examples of the higher fatty acid amide include saturated higher fatty acid amide such as lauric acid amide, palmitic acid amide, stearic acid amide, and behenic acid amide; unsaturated higher fatty acid amide such as erucic acid amide, oleic acid amide, brassidic acid amide, and elaidic acid amide; substituted amide such as N-stearyl stearic acid amide, N-oleyl oleic acid amide, N-stearyl oleic acid amide, N-oleyl stearic acid amide, N-stearyl erucic acid amide, and N-oleyl palmitic acid amide; methylol amide such as methylol stearic acid amide and methylol bechenic acid amide; saturated fatty acid bis amide such as methylene bis stearic acid amide, ethylene bis capric acid amide, ethylene bis lauric acid amide, ethylene bis stearic acid amide (ethylene bis stearyl amide), ethylene bis isostearic acid amide, ethylene bis hydroxy stearic acid amide, ethylene bis bechenic acid amide, hexamethylene bis stearic acid amide, hexamethylene bis bechenic acid amides, hexaethylene bis hydroxy stearic acid amide, N, N'-distearyl adipic acid amides, and N, N'-distearyl sebasic acid amide; unsaturated fatty acid bis amide such as ethylene bis oleic acid amide, hexamethylene bis oleic acid amide, N, N'-dioleoyl adipic acid amide, and N, N'-dioleoyl sebacic acid amide.

The higher fatty acid salt (metallic soap) is salt of the higher fatty acid and alkali metal, alkaline earth metal, or zinc. Examples of the alkaline metal include lithium, sodium, and potassium. Examples of the alkali earth metal include magnesium, calcium, and barium. Specific examples of the higher fatty acid salt include lithium stearate, calcium stearate, magnesium stearate, zinc stearate, etc.

Specific examples of these lubricants include "LICO-WAX (product name)" manufactured by Clariant Plastics & Coatings (Japan) K. K. as polyethylene oxide wax that is the hydrocarbon based wax, "ANSTEX (product name)" manufactured by TOHO Chemical Industry Co., Ltd. and "Rikemar (product name)" manufactured by RIKEN VITAMIN Co., Ltd. as glycerin monostearate that is the higher fatty acid ester, "Diamid (product name)" manufactured by Mitsubishi Chemical Corporation as lauric acid amide that is the higher fatty acid amide, the palmitic acid amide, and the palmitic acid amide, "Kaowax (product name)" manufactured by Kao Corporation as the ethylene bis stearic acid amide, "Calcium stearate" manufactured by TAIHEI CHEMICAL INDUSTRIAL CO., LTD. as calcium stearate that is the higher fatty acid salt, and "zinc stearate" manufactured by NITTO KASEI KOGYO K. K. as zinc stearate.

The blending amount of the lubricant is determined in consideration of the blending amount of the lubricating oil. The blending amount of the lubricant is 0.1 to 5% by mass, preferably 0.5 to 3% by mass. If the blending amount is less than 0.1% by mass, the lubricant cannot serve as a carrier for absorbing and retaining the lubricating oil. On the other hand, if the blending amount exceeds 5% by mass, decrease in the mechanical strength of the sliding member, deterioration of surface appearance of the sliding member, and poor bite into the screw may occur.

The colorant is not particularly limited. Examples of the colorant include dye such as azo, anthraquinone, and triphenylmethane, and pigment such as titanium oxide, cadmium sulfide, phthalocyanine, and carbon black. The blending amount is 1 to 5% by mass, preferably 1 to 3% by mass. If the blending amount is less than 1% by mass, there is no effect as a colorant. On the other hand, if the blending amount exceeds 5% by mass, the slidability of the sliding member may be adversely affected.

The resin composition of the present invention is easily prepared by a known method generally used as a method for preparing a conventional resin composition. For example, the plant-derived polyethylene resin, the petroleum-derived polyethylene resin as the additive, the modified polyolefin resin as the additive, the lubricating oil as the additive, and the plant-derived filler as the additive, or in addition to these, the lubricant and the colorant are weighed so that each of them becomes a predetermined amount. And, these are mixed with a mixer such as a henschel mixer, a super mixer, a ball mill, and a tumbler mixer to prepare a mixture. Then, the mixture is put into a uniaxial or biaxial screw type extruder and melt-kneaded to form a string-shaped molded product (strand). After that, the string-shaped molded product is cut to prepare pellets as a molding material. For another example, the petroleum-derived polyethylene resin as the additive, the modified polyolefin resin as the additive, the lubricating oil as the additive, and the plant-derived filler as the additive, or in addition to these, the lubricant and the colorant are weighed so that each of them becomes a predetermined amount. And, these are mixed in the same mixer as above to prepare a mixture. Then, the mixture is put into the uniaxial or biaxial screw type extruder and melt-kneaded to form a string-shaped molded product. After that, the string-shaped molded product is cut to prepare pellets. Then, these pellets are mixed with the plant-derived polyethylene resin that is the main component in a predetermined amount to use as a molding material.

The resin composition of the present invention has good biting property into the screw of the molding machine and excellent molding processability. Further, according to the sliding member made of the resin composition, the mechanical strength of the plant-derived polyethylene resin is improved, and the sliding characteristics including low friction and wear resistance are improved in the sliding friction with the mating material.

EXAMPLE

Hereinafter, the present invention will be described in more detail with reference to Examples.

However, the present invention is not limited to the following examples as long as the scope of the present invention is not exceeded. The moldability from the resin composition to the molding material, the moldability from the molding material to the sliding member, and the friction and wear characteristics of the sliding member made of the resin composition were evaluated by the following methods.
<Moldability (1)>

In the case that the mixture (resin composition) was melt-kneaded using the extruder to form the string-shaped molded product and then cut to produce pellets, presence or absence of breakage (cutting) of the string-shaped molded product, biting property into the screw, and surface condition of the pellets (generation of voids (air bubbles), etc.) were visually observed. The evaluation was made according to the evaluation criteria in Table 1.

TABLE 1

| ⊚ | Excellent |
|---|---|
| ○ | Good |
| X | Impossible |

<Moldability (2)>

In the case that the sliding members was molded from the pellets using the injection molding machine, biting property of the pellets into the screw, releasability of the sliding members from mold, and surface condition (peeling, etc.) of the sliding members were visually observed. The evaluation was made according to the evaluation criteria in Table 2.

TABLE 2

| ⊚ | Excellent |
|---|---|
| ○ | Good |
| X | Impossible |

<Friction and Wear Characteristics>

Friction coefficient and amount of wear were measured under conditions shown in Table 3 using a thrust tester. As shown in FIG. 1, a square bearing test piece (sliding member) 1 having a side of 30 mm and a thickness of 3 mm was fixed to a test table. Then, while applying a predetermined load from a cylinder 2 as opposite member to one surface 3 of the bearing test piece 1 in direction X orthogonal to the surface 3, the cylinder 2 was rotated in direction Y around axis 4 of the cylinder 2. And friction coefficient between the bearing test piece 1 and the cylindrical body 2 and amount of wear on the surface 3 of the bearing test piece 1 after the test were measured. The friction coefficient is shown by friction coefficient at the time of stability from 1 hour after the start of the test to the end of the test. The amount of wear is shown by amount of dimensional change of the sliding surface after 8 hours of the test time.

TABLE 3

| <Thrust test> | |
|---|---|
| Sliding speed | 1 m/min |
| Load (surface pressure) | 100 kgf/cm² |
| Test time | 8 hours |
| Test piece | Square sliding member |
| | (3 mm on a side, 1 mm in thickness) |

TABLE 3-continued

| <Thrust test> | |
| --- | --- |
| Opposite member | Hollow cylindrical opposite member [Carbon steel for machine structure (S45C) inner diameter 20 mm, outer diameter 25.6 mm, length 15 mm] |
| Lubrication | No lubrication |

In the following examples, the following materials were used as the plant-derived polyethylene resin, the petroleum-derived polyethylene resin, the modified polyolefin resin, the lubricating oil, the plant-derived filler, the lubricant, and the colorant. The following materials all indicate product names.

[A] Plant-Derived Polyethylene Resin (A-1) Plant-Derived High-Density Polyethylene Resin (HDPE)

"GREEN-SHE150" manufactured by Braskem S. A. Density 0.948 g/cm³, MFR (melt flow rate: temperature 190° C., load 2.16 kg) 1.0 g/10 minutes

[B] Petroleum-Derived Polyethylene Resin (B-1) High Density Polyethylene Resin

"HI-ZEX (product name)" manufactured by Prime Polymer Co., Ltd.

(B-2) Ultra-High Molecular Weight Polyethylene Resin

"MIPELON (product name)" manufactured by Mitsui Chemicals, Inc.

(B-3) Maleic Anhydride Acid-Modified Ultra-High Molecular Weight Polyethylene Resin "MODIFIED LUBMER (product name)" manufactured by Mitsui Chemicals, Inc.

[C] Modified Polyolefin Resin (C-1) Ethylene-vinyl acetate copolymer saponified

"Technolink K431-80" manufactured by Taoka Chemical Co., Ltd. (vinyl acetate content before saponification 28% by mass, saponification degree 80%, MFR 4 g/10 minutes: 190° C., load 2.16 kg).

(C-2) Ethylene-Vinyl Acetate Copolymer Saponified

"MELTHENE H-6051" manufactured by Tosoh Corporation (vinyl acetate content before saponification 28% by mass, saponification degree 100%, MFR 5.5 g/10 minutes: 190° C., load 2.16 kg).

(C-3) Maleic Anhydride-Modified Polyethylene Resin

"ADMER-NF518" manufactured by Mitsui Chemicals, Inc. (MFR 2.2 g/10 minutes: 230° C., load 2.16 kg).

(C-4) Maleic Anhydride-Modified Ethylene-Propylene Copolymer

"TAFMER-MP0620" manufactured by Mitsui Chemicals, Inc. (MFR 0.3 g/10 minutes: 230° C., load 2.16 kg).

(C-5) Maleic Anhydride-Modified Ethylene-Butene Copolymer

"TAFMER-MH7020" manufactured by Mitsui Chemicals, Inc. (MFR 1.5 g/10 minutes: 230° C., load 2.16 kg).

(C-6) Maleic Anhydride-Modified Styrene-Ethylene/Butylene-Styrene Copolymer

"Tuftec H1517" manufactured by Asahi Kasei Chemicals Co., Ltd. (MFR 3.0 g/10 minutes: 230° C., load 2.16 kg)

[D] Lubricating Oil (D-1) Paraffin Oil

"MORESCO WHITE P-350P" manufactured by MORESCO Corporation.

(D-2) Hydrocarbon-Based Synthetic Oil (Ethylene α-Olefin Oligomer)

"LUCANT" manufactured by Mitsui Chemicals, Inc.

(D-3) Vegetable Oil (the Jojoba Oil)

"Jojoba golden" imported by Mitsuba Trading Co., Ltd.

[E] Plant-Derived Filler (E-1) Cellulose Fiber

"Fibra Cel SW-10: Plant-derived, average fiber diameter 20 μm, average fiber length 700 μm" manufactured by Celite Corporation.

(E-2) Cellulose Nanofiber

"Serish KY-100G: average fiber diameter 100 nm" manufactured by Daicel finechem Ltd, (E-3) Cellulose Granules (Wood Pulp)

"KC flock: average particle diameter 37 μm" manufactured by Nippon Paper Industries Co., Ltd.

(E-4) Bamboo Fiber

"Bamboo powder: average particle size 178 μm" manufactured by NAKAWOOD Co., Ltd.

(E-5) Hemp Fiber

"Tosco hemp cellulose powder: average particle size 22 μm" manufactured by TOSCO Co., Ltd.

(E-6) Tree Granules

"Cedar powder: average particle size 178 μm" manufactured by NAKAWOOD Co., Ltd.

[F] Lubricant (F-1) Hydrocarbon Wax (Polyethyleneoxide Wax)

"LICOWAX" manufactured by Clariant Plastics Coatings (Japan) K. K.

(F-2) Higher Fatty Acid Amide (Ethylenebisstearic Acid Amide)

"Kaowax" manufactured by Kao Corporation.

(F-3) Higher Fatty Acid Ester (Glycerin Monostearate)

"ANSTEX" manufactured by TOHO Chemical Industry Co., Ltd.

[G] Colorant (G-1) Carbon Black

"KETJENBLACK" manufactured by LION SPECIALTY CHEMICALS CO., LTD.

(G-2) Phthalocyanine Blue

"Pigment Blue 15" manufactured by Tokyo Chemical Industry Co., Ltd.

Examples 1-20

Plant-derived polyethylene resin as the main component, as additives, the petroleum-derived polyethylene resins (B-1) to (B-3), the modified polyolefin resins (C-1) to (C-6), the lubricating oils (D-1) to (D-3), the plant-derived fillers (E-1) to (E-6), the lubricants (F-1) to (F-3), and the colorants (G-1) to (G-2) were prepared and weighed in the amount ratios shown in Tables 4 to 7. Next, these were mixed with the tumbler mixer to prepare the mixture. Then, the mixture was supplied to the biaxial screw vent type extruder and melt-kneaded to form the string-shaped molded product. After that, the string-shaped molded product was cut to prepare pellets, and the pellets were used as the molding material. In the manufacturing process, presence or absence of breakage (cutting) of the string-shaped molded product, biting property into the screw, and surface condition of the pellets (generation of voids, etc.) were visually observed. These evaluations are shown in the characteristics of Tables 4 to 7.

Next, the molding material was supplied to the screw type injection molding machine and injection molded to produce the square type sliding member having dimensions of 30 mm on a side and 3 mm in thickness. In the manufacturing process, biting property of the pellets into the screw when the sliding members was molded from the pellets, releasability of the square type sliding members from mold, and surface condition (peeling, etc.) of the sliding members were visually observed. These evaluations are shown in the characteristics of Tables 4 to 7. Further, the results of the evaluation of the friction coefficient and the amount of wear of the square type sliding members based on the above described evaluation method are shown in the characteristics of Tables 4 to 7.

Comparative Examples 1 to 4

Plant-derived polyethylene resin similar to the above, as additives, the petroleum-derived polyethylene resin (B-3), the modified polyolefin resin (C-2), the lubricating oil (D-3), the plant-derived filler (E-3), the lubricant (F-3), and the colorant (G-1) were prepared and weighed in the amount ratios shown in Table 7. Next, these were mixed with the tumbler mixer to prepare the mixture. Then, the mixture was supplied to the biaxial screw vent type extruder and melt-kneaded to form the string-shaped molded product. After that, the string-shaped molded product was cut to prepare pellets, and the pellets were used as the molding material. In the manufacturing process, presence or absence of breakage (cutting) of the string-shaped molded product, biting property into the screw, and surface condition of the pellets (generation of voids, etc.) were visually observed. These evaluations are shown in the characteristics of Table 8.

Next, the molding material was supplied to the screw type injection molding machine and injection molded to produce the square type sliding member having dimensions of 30 mm on a side and 3 mm in thickness. In the manufacturing process, biting property of the pellets into the screw when the sliding members was molded from the pellets, releasability of the square type sliding members from mold, and surface condition (peeling, etc.) of the sliding members were visually observed. These evaluations are shown in the characteristics of Table 8. Further, the results of the evaluation of the friction coefficient and the amount of wear of the square type sliding member based on the above described evaluation method are shown in the characteristics of Table 8.

TABLE 4

| | | Examples | | | | |
|---|---|---|---|---|---|---|
| | | 1 | 2 | 3 | 4 | 5 |
| Ingredient | [A] Plant-derived polyethylene resin | | | | | |
| composition | (A-1) | 97.8 | 92.4 | 87 | 74 | 76 |
| | [B] Petroleum-derived polyethylene resin | | | | | |
| | (B-1) | 0.1 | | | | |
| | (B-2) | | | 3 | 5 | |
| | (B-3) | | 0.5 | | | 10 |
| | [C] Modified polyolefin resin | | | | | |
| | (C-1) | 0.5 | | | | |
| | (C-2) | | 0.1 | | | |
| | (C-3) | | | 1 | | |
| | (C-4) | | | | 5 | |
| | (C-5) | | | | | 3 |
| | (C-6) | | | | | |
| | [D] Lubricating oil | | | | | |
| | (D-1) | 0.5 | | | | 5 |
| | (D-2) | | | 3 | | |
| | (D-3) | | 3 | | 5 | |
| | [E] Plant-derived filler | | | | | |
| | (E-1) | 0.1 | | | | |
| | (E-2) | | | | | 5 |
| | (E-3) | | 3 | 5 | | |
| | (E-4) | | | | 10 | |
| | (E-5) | | | | | |
| | (E-6) | | | | | |
| | [F] Lubricant | | | | | |
| | (F-1) | | | | | |
| | (F-2) | | | | | |
| | (F-3) | | | | | |
| | [G] Colorant | | | | | |
| | (G-1) | 1 | 1 | | 1 | |
| | (G-2) | | | 1 | | 1 |
| Characteristics | <Moldability> | | | | | |
| | (Moldability1) | ◎ | ◎ | ◎ | ◎ | ◎ |
| | (Moldability2) | ◎ | ◎ | ◎ | ◎ | ◎ |
| | <Sliding characteristics> | | | | | |
| | Friction coefficient | 0.14 | 0.12 | 0.10 | 0.10 | 0.10 |
| | Amount of wear (μm) | 52 | 46 | 42 | 40 | 39 |

TABLE 5

| | | Examples | | | | |
|---|---|---|---|---|---|---|
| | | 6 | 7 | 8 | 9 | 10 |
| Ingredient | [A] Plant-derived polyethylene resin | | | | | |
| composition | (A-1) | 63.5 | 59 | 89 | 84 | 89 |
| | [B] Petroleum-derived polyethylene resin | | | | | |
| | (B-1) | | 5 | | | |
| | (B-2) | | | | | |
| | (B-3) | 20 | | 0.5 | 0.5 | 0.5 |
| | [C] Modified polyolefin resin | | | | | |
| | (C-1) | | | | | |
| | (C-2) | | 10 | 1 | 1 | 1 |
| | (C-3) | | | | | |
| | (C-4) | | | | | |
| | (C-5) | | | | | |
| | (C-6) | 0.5 | | | | |
| | [D] Lubricating oil | | | | | |
| | (D-1) | 5 | | | | |
| | (D-2) | | | | 3 | |
| | (D-3) | | 5 | 3 | | 3 |
| | [E] Plant-derived filler | | | | | |
| | (E-1) | | | | | |
| | (E-2) | | | | | 5 |
| | (E-3) | | | 5 | 10 | |
| | (E-4) | | | | | |
| | (E-5) | 10 | | | | |
| | (E-6) | | 20 | | | |
| | [F] Lubricant | | | | | |
| | (F-1) | | | | | |
| | (F-2) | | | | | |
| | (F-3) | | | 0.5 | 0.5 | 0.5 |
| | [G] Colorant | | | | | |
| | (G-1) | 1 | 1 | 1 | | 1 |
| Characteristics | (G-2) | | | | 1 | |
| | <Moldability> | | | | | |
| | (Moldability1) | ◎ | ◎ | ◎ | ◎ | ◎ |
| | (Moldability2) | ◎ | ◎ | ◎ | ◎ | ◎ |
| | <Sliding characteristics> | | | | | |
| | Friction coefficient | 0.11 | 0.12 | 0.09 | 0.09 | 0.08 |
| | Amount of wear (µm) | 38 | 36 | 33 | 32 | 28 |

TABLE 6

| | | Examples | | | | |
|---|---|---|---|---|---|---|
| | | 11 | 12 | 13 | 14 | 15 |
| Ingredient | [A] Plant-derived polyethylene resin | | | | | |
| composition | (A-1) | 89 | 89 | 84 | 71 | 56 |
| | [B] Petroleum-derived polyethylene resin | | | | | |
| | (B-1) | | | | | 5 |
| | (B-2) | | | 3 | 5 | |
| | (B-3) | 0.5 | 0.5 | | | |
| | [C] Modified polyolefin resin | | | | | |
| | (C-1) | | | | | |
| | (C-2) | 1 | 1 | | | 10 |
| | (C-3) | | | 1 | | |
| | (C-4) | | | | 5 | |
| | (C-5) | | | | | |
| | (C-6) | | | | | |

TABLE 6-continued

| | | Examples | | | | |
|---|---|---|---|---|---|---|
| | | 11 | 12 | 13 | 14 | 15 |
| | [D] Lubricating oil | | | | | |
| | (D-1) | | | | | |
| | (D-2) | | | 3 | | |
| | (D-3) | 3 | 3 | | 5 | 5 |
| | [E] Plant-derived filler | | | | | |
| | (E-1) | | | | | |
| | (E-2) | | | | | |
| | (E-3) | | | 5 | | |
| | (E-4) | 5 | | | 10 | |
| | (E-5) | | | | | |
| | (E-6) | | 5 | | | 20 |
| | [F] Lubricant | | | | | |
| | (F-1) | | | | | |
| | (F-2) | | | | 3 | |
| | (F-3) | 0.5 | 0.5 | 3 | | 3 |
| | [G] Colorant | | | | | |
| | (G-1) | 1 | | | 1 | 1 |
| | (G-2) | | 1 | 1 | | |
| Characteristics | <Moldability> | | | | | |
| | (Moldability1) | ◎ | ◎ | ◎ | ◎ | ◎ |
| | (Moldability2) | ◎ | ◎ | ◎ | ◎ | ◎ |
| | <Sliding characteristics> | | | | | |
| | Friction coefficient | 0.09 | 0.09 | 0.09 | 0.10 | 0.10 |
| | Amount of wear (μm) | 24 | 28 | 32 | 33 | 34 |

TABLE 7

| | | Examples | | | | |
|---|---|---|---|---|---|---|
| | | 16 | 17 | 18 | 19 | 20 |
| Ingredient | [A] Plant-derived polyethylene resin | | | | | |
| composition | (A-1) | 62 | 56 | 51 | 46 | 42 |
| | [B] Petroleum-derived polyethylene resin | | | | | |
| | (B-1) | | 1 | | | |
| | (B-2) | | | 1 | | |
| | (B-3) | 1 | | | 1 | 1 |
| | [C] Modified polyolefin resin | | | | | |
| | (C-1) | | | | | |
| | (C-2) | 1 | 3 | | | 1 |
| | (C-3) | | | | 1 | |
| | (C-4) | | | 3 | | |
| | (C-5) | | | | | |
| | (C-6) | | | | | |
| | [D] Lubricating oil | | | | | |
| | (D-1) | | | | | |
| | (D-2) LUCANT | | | 3 | | 3 |
| | (D-3) Jojoba | 5 | 3 | | 5 | |
| | [E] Plant-derived filler | | | | | |
| | (E-1) | 30 | | | | |
| | (E-2) | | 35 | | | |
| | (E-3) | | | 40 | | |
| | (E-4) | | | | 45 | |
| | (E-5) | | | | | |
| | (E-6) | | | | | 50 |
| | [F] Lubricant | | | | | |
| | (F-1) | | | | | |
| | (F-2) | | | | | |
| | (F-3) | | 1 | 1 | 1 | 2 |

TABLE 7-continued

|  |  | Examples | | | | |
|---|---|---|---|---|---|---|
|  |  | 16 | 17 | 18 | 19 | 20 |
|  | [G] Colorant | | | | | |
|  | (G-1) | 1 |  |  | 1 | 1 |
|  | (G-2) |  | 1 | 1 |  |  |
| Characteristics | <Moldability> | | | | | |
|  | (Moldability1) | ◎ | ◎ | ◎ | ◎ | ◎ |
|  | (Moldability2) | ◎ | ◎ | ◎ | ◎ | ◎ |
|  | <Sliding characteristics> | | | | | |
|  | Friction coefficient | 0.12 | 0.10 | 0.14 | 0.10 | 0.14 |
|  | Amount of wear (μm) | 32 | 30 | 28 | 34 | 36 |

TABLE 8

|  |  | Comparative examples | | | |
|---|---|---|---|---|---|
|  |  | 1 | 2 | 3 | 4 |
| Ingredient | [A] Plant-derived polyethylene resin | | | | |
| composition | (A-1) | 94 | 91.5 | 82.5 | 34 |
|  | [B] Petroleum-derived polyethylene resin | | | | |
|  | (B-1) |  |  |  |  |
|  | (B-2) |  |  |  |  |
|  | (B-3) | 0.5 | 0.5 | 0.5 | 0.5 |
|  | [C] Modified polyolefin resin | | | | |
|  | (C-1) |  |  |  |  |
|  | (C-2) | 1 | 1 |  | 1 |
|  | (C-3) |  |  |  |  |
|  | (C-4) |  |  |  |  |
|  | (C-5) |  |  |  |  |
|  | (C-6) |  |  |  |  |
|  | [D] Lubricating oil | | | | |
|  | (D-1) |  |  |  |  |
|  | (D-2) |  |  |  |  |
|  | (D-3) | 3 |  | 5 | 3 |
|  | [E] Plant-derived filler | | | | |
|  | (E-1) |  |  |  |  |
|  | (E-2) |  |  |  |  |
|  | (E-3) |  | 5 | 10 | 60 |
|  | (E-4) |  |  |  |  |
|  | (E-5) |  |  |  |  |
|  | (E-6) |  |  |  |  |
|  | [F] Lubricant | | | | |
|  | (F-1) |  |  |  |  |
|  | (F-2) |  |  |  |  |
|  | (F-3) | 0.5 | 1 | 1 | 0.5 |
|  | [G] Colorant | | | | |
|  | (G-1) | 1 | 1 | 1 | 1 |
|  | (G-2) |  |  |  |  |
| Characteristics | <Moldability> | | | | |
|  | (Moldability1) | ○ | ◎ | ○ | X |
|  | (Moldability2) | ○ | ◎ | ○ | — |
|  | <Sliding characteristics> | | | | |
|  | Friction coefficient | 0.28 | 0.15 | 0.12 | — |
|  | Amount of wear (μm) | 142 | 132 | 74 | — |

From the above test results, examples 1-20 of the resin composition have good biting property into the screw in the extrusion molding. In addition, no breakage (cutting) of the string-shaped molded products is observed in the molding process of the string-shaped molded products. Further, it is confirmed that the molding materials (pellets) formed from the string-shaped molded products have good biting property into the screw of the injection molding machine and have excellent molding processability. In addition, it is confirmed that the surface of the molded products has no peeling and has an excellent surface condition. On the other hand, comparative examples 1-3 of the resin composition have no particular problem in terms of biting property into the screw in the extrusion molding, moldability of the string-shaped molded products, and moldability of the molding materials formed from the string-shaped molded products. However, in comparative example 4 of the resin composition, biting property into the screw in the extrusion molding is poor, and good string-shaped molded products could not be obtained.

Further, examples 1-20 of the sliding members made of the resin composition all showed a low coefficient of friction and a small amount of wear. On the other hand, comparative example 1 of the sliding member made of the resin composition showed a high coefficient of friction and a very large amount of wear. In particular, comparative examples 2-3 of the sliding member made of the resin composition showed a very large amount of wear. In comparative example 4 of the resin composition, the friction and wear characteristics were not tested because the molding material could not be obtained therefore the sliding member could not be obtained. From the above, it can be seen that the sliding members made of the resin composition of examples have excellent sliding characteristics in comparison with the sliding members made of the resin composition of comparative examples.

As described above, the resin composition and the sliding member of the present invention have good biting property into the screw and excellent molding processability. Further, the molded product has no peeling on the surface and has an excellent surface condition. In addition, according to the sliding member made of the resin composition, the sliding characteristics including low friction and wear resistance are significantly improved in the sliding friction with the opposite member. Therefore, according to the present invention, such the resin composition and the sliding member can be provided.

REFERENCE SIGNS LIST

1 Bearing test piece (sliding member)
2 Cylinder (opposite member)
4 Axis

The invention claimed is:

1. A resin composition for a sliding member, the resin composition comprising:
  a plant-derived polyethylene resin as a matrix; and
  additives that are added to the plant-derived polyethylene resin, the additives comprising:
    a petroleum-derived polyethylene resin of 0.1 to 20% by mass;
    a modified polyolefin resin of 0.1 to 10% by mass;
    a lubricating oil of 0.5 to 5% by mass; and
    a plant-derived filler of 0.1 to 50% by mass, wherein the plant-derived polyethylene resin consists of a plant-derived high-density polyethylene resin,
  wherein the petroleum-derived polyethylene resin is selected from high-density polyethylene resin, ultrahigh molecular weight polyethylene resin and acidmodified ultra-high molecular weight polyethylene resin,
  wherein the lubricating oil is selected from animal oil, vegetable oil, and ether-based synthetic oil,
  wherein the modified polyolefin resin is selected from polyolefin resin graft-modified with unsaturated carboxylic acid, anhydride thereof or derivative thereof, and polyolefin resin saponified obtained by saponifying polyolefin resin having an acetoxy group in a molecular chain with alkali, and
  wherein the plant-derived filler is selected from cellulose fiber, cellulose granules, and cellulose nanofiber.

2. A resin composition for a sliding member according to claim 1, wherein:
  the polyolefin resin graft-modified with the unsaturated carboxylic acid, the anhydride thereof or the derivative thereof is selected from maleic anhydride-modified polyethylene resin, maleic anhydride-modified polypropylene resin, maleic anhydride-modified ethyleneα-olefin copolymer, and maleic anhydride-modified styrene-ethylene/butylene-styrene copolymer.

3. A resin composition for a sliding member according to claim 1, wherein:
  the polyolefin resin saponified is ethylene-vinyl acetate copolymer saponified.

4. A resin composition for a sliding member according to claim 1, wherein:
  as additive, lubricant that is selected from natural wax, hydrocarbon wax, higher fatty acid, higher fatty acid ester, higher fatty acid amide, and higher fatty acid salt (metallic soap) is blended in a proportion of 0.1 to 5% by mass.

5. A resin composition for a sliding member according to claim 1, wherein:
  as additive, colorant that consists of pigment or dye is blended in a proportion of 1 to 5% by mass.

6. A sliding member made of the resin composition according to claim 1.

7. A sliding member made of the resin composition according to claim 2.

8. A sliding member made of the resin composition according to claim 3.

9. A sliding member made of the resin composition according to claim 4.

10. A sliding member made of the resin composition according to claim 5.

* * * * *